United States Patent
Sloan, Jr.

(10) Patent No.: US 6,695,402 B2
(45) Date of Patent: Feb. 24, 2004

(54) ADJUSTABLE LUMBAR SUPPORT

(76) Inventor: Paul H. Sloan, Jr., 7189 Texas Heights Ave., Kalamazoo, MI (US) 49009

( * ) Notice: Subject to any disclaimer, the term of this patent is extended or adjusted under 35 U.S.C. 154(b) by 0 days.

(21) Appl. No.: 10/113,003

(22) Filed: Mar. 29, 2002

(65) Prior Publication Data

US 2003/0184139 A1 Oct. 2, 2003

(51) Int. Cl.[7] ................................................. A47C 3/025
(52) U.S. Cl. ...................................................... 297/284.4
(58) Field of Search ........................... 297/284.4, 284.1, 297/284.8

(56) References Cited

U.S. PATENT DOCUMENTS

| | | | | |
|---|---|---|---|---|
| 4,295,681 A | * | 10/1981 | Gregory | |
| 4,678,230 A | * | 7/1987 | Winkle | |
| 5,088,790 A | * | 2/1992 | Wainwright et al. | |
| 5,217,278 A | * | 6/1993 | Harrison et al. | |
| 5,553,919 A | * | 9/1996 | Dennis | |

FOREIGN PATENT DOCUMENTS

| | | | |
|---|---|---|---|
| EP | 0458440 | * | 11/1991 |
| JP | 5146342 | * | 6/1993 |

* cited by examiner

*Primary Examiner*—Milton Nelson, Jr.
(74) *Attorney, Agent, or Firm*—R. Tracy Crump

(57) ABSTRACT

An adjustable lumbar support for chairs and vehicle seats, which provides an adjustable contour to the seat back for varying degrees of lumbar support to the seat occupant is disclosed. The lumbar support includes a mounting base, a lumbar plate, and a pair of articulated linkage arms. Each of the linkage arms includes an upper and lower segment, which are pivotally connected by an elbow joint. The lower segments of each linkage arm are pivotally connected to the mounting base and the upper segments of each linkage arm are pivotally connected to the lumbar plate. A Bowden cable is connected to the linkage arms at the elbow joints, such that extending or retracting the cable pulls or pushes the elbow joints together or apart to actuate the lumbar support. The linkage mechanism composed of the linkage arms and the six pivotal joints allows the lumbar plate a limited degree of pivotal movement between its fully extended and fully retracted positions.

14 Claims, 6 Drawing Sheets

ADJUSTABLE LUMBAR SUPPORT

This invention relates to an adjustable lumbar support for chairs and vehicle seats, which provide an adjustable contour to the seat back for varying degrees of lumbar support to the seat occupant.

BACKGROUND OF THE INVENTION

Commercially produced chairs and vehicle seats with fixed back supports do not provide adequate lumbar support for many users. Adjustable lumbar supports have been developed to improve the comfort of conventional seats. Adjustable lumbar supports are mechanical devices built into the seat frame that extend and retract within the frame to alter the contour of the lumbar region of the seat back. Typically, adjustable lumbar supports are actuated by a Bowden cable, which is controlled by a mechanical regulator or some other electronic control device that is readily accessible to the seat occupant. Conventional adjustable lumbar supports are heavy and complicated mechanical devices, that must be specifically designed for installation with the internal frames of the particular chairs and vehicle seating. Most lumbar supports employ either a linkage (scissor) type actuation mechanism or an arching type actuation mechanism.

U.S. Pat. Nos. 5,553,919; 4,564,235; 4,657,304; 4,313,637; 4,295,681; and 4,182,533 describe typical lumbar supports, which employ linkage or scissor type actuation mechanism. These lumbar supports include a lumbar plate, which is moved up and down against the seat back by the actuation of a linkage mechanism of scissored or lever arms. The range of lumbar adjustability is limited by the amount of travel afforded by the length of the lever arms of the linkage mechanism. Decreasing the size of the lumbar support often reduces the range of lumbar adjustability. Increasing the travel of the linkage mechanism means increasing the size and weight of the lumbar support, which leads to increased material costs and space required for installation within the seat back. In addition, increasing the size of the linkage mechanism also increase the amount of pulling force from the Bowden cables needed to actuate the lumbar support. The length, weight and complexity of the linkage mechanism all add to the inertial force or load, which the Bowden cable must over come in order to actuate the mechanism.

U.S. Pat. Nos. 6,254,187; 6,003,941; 5,775,773; 5,626,390; 5,498,063; 5,462,335; 5,397,164; and 5,050,930 describe typical lumbar supports, which employ an arching type actuation mechanism. These lumbar supports include one or more resilient bands that are bowed against the seat back to various degrees to adjust the contour of the seat back. The resilient bands are bowed by mechanisms connected to the Bowden cable. In an arching type lumbar support, the bowing of the bands creates an inherent spring tension in the actuation mechanism. Consequently, additional force must be applied to the Bowden cable to just over come the inherent load or spring tension in the mechanism itself.

As described, both linkage and arching type lumbar supports have several practical drawbacks. It continues to be desirable to have small light weight modular lumbar supports, which require minimal force to actuate. It is particularly desirable to have a lumbar support whose actuation mechanism has little or no inherent load, which must be over come by the Bowden cable or adjustment controls.

SUMMARY OF THE INVENTION

The adjustable lumbar support of this invention is a small light weight modular device that requires minimal force to actuate. The lumbar support employs a linkage mechanism that has little or no inherent load, which must be over come by the Bowden cable or adjustment controls. The lumbar support includes a mounting base, a lumbar plate, and a pair of articulated linkage arms. Each linkage arms includes an upper and lower segment, which are pivotally connected by an elbow joint. The lower segments are pivotally connected to the mounting base and the upper segments are pivotally connected to the lumbar plate. A Bowden cable is connected to the linkage arms at the elbow joints, such that extending or retracting the cable pulls or pushes the elbow joints together or apart to actuate the lumbar support. The linkage mechanism composed of the linkage arms and the six pivotal joints allows the lumbar plate a limited degree of pivotal movement between its fully extended and fully retracted positions. This "floating" action creates a self adjustment mechanism, which ensures that the lumbar plate remains parallel to the seat back even as a seat occupant shifts in the seat. Each of these components is constructed of composite materials, such as a strong fiberglass reinforced thermoplastic, which reduces the weight of the device while providing sufficient structural strength and integrity. Furthermore, the plastic construction provides resilience and the ability to form the components so that they can be assembled by snap fit interlocking connection, thereby eliminating fasteners and other linkage components.

Accordingly, an advantage of the lumbar support of this invention is that it provides a small light weight modular device, which can be easily incorporated into conventional chair and vehicle seat designs.

Another advantage of this invention is that the lumbar support allows the lumbar plate to pivot or "float" independently of the linkage mechanism between its fully extended and fully retracted positions.

Another advantage of this invention is that the linkage mechanism of the lumbar support exerts little or no inherent load or inertia on the Bowden cable or actuation controls.

Another advantage of this invention is that the components of the lumbar support are constructed from composites or plastics so as to reduce the weight and the complexity of the device.

Other advantages will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

Figure 1:
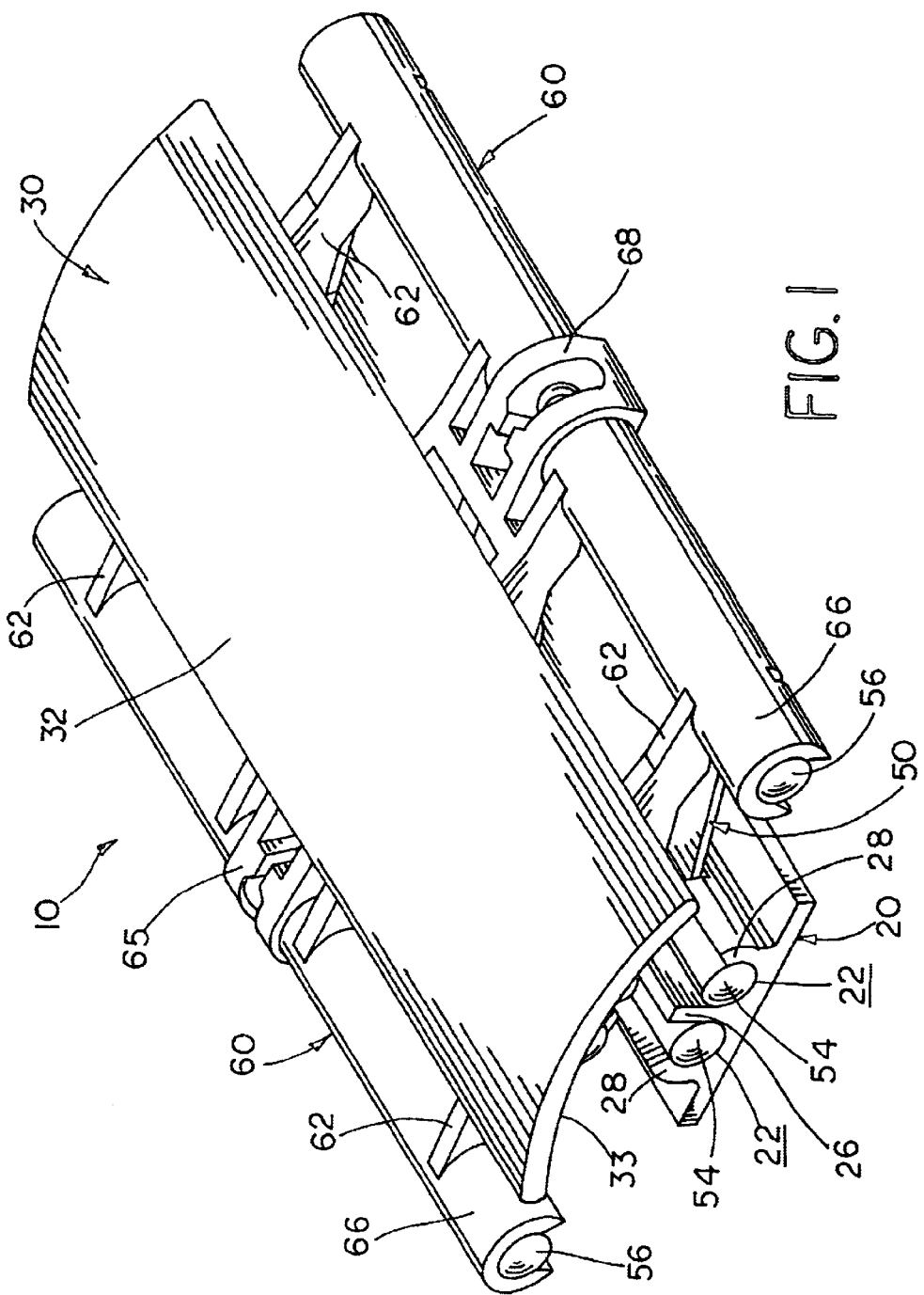
FIG. 1 is a perspective view of the lumbar support of this invention.

The preferred embodiment herein described is not intended to be exhaustive or to limit the invention to the precise form disclosed. It is chosen and described to best explain the invention so that others skilled in the art might utilize its teachings.

In the figures, the adjustable lumbar support of this invention is designated generally as reference numeral 10. Lumbar support 10 includes a mounting bracket or base designated generally as reference numeral 20, a lumbar plate designated generally as reference numeral 30, a pair of articulated linkage arms 40 designated generally in FIGS. 4–6 only as reference numeral 40. Each of the components of lumbar support 10 is constructed of composite materials, such as a strong fiberglass reinforced thermoplastic. The use of composites and plastic provides several advantages. Reinforced thermal plastics are light weight and provide sufficient structural strength and integrity for the actuation mechanism. In addition, the plastic construction provides resilience and the ability to form the components so that they can be assembled by snap fit interlocking connection, thereby eliminating fasteners and other linkage components.

Figure 4:
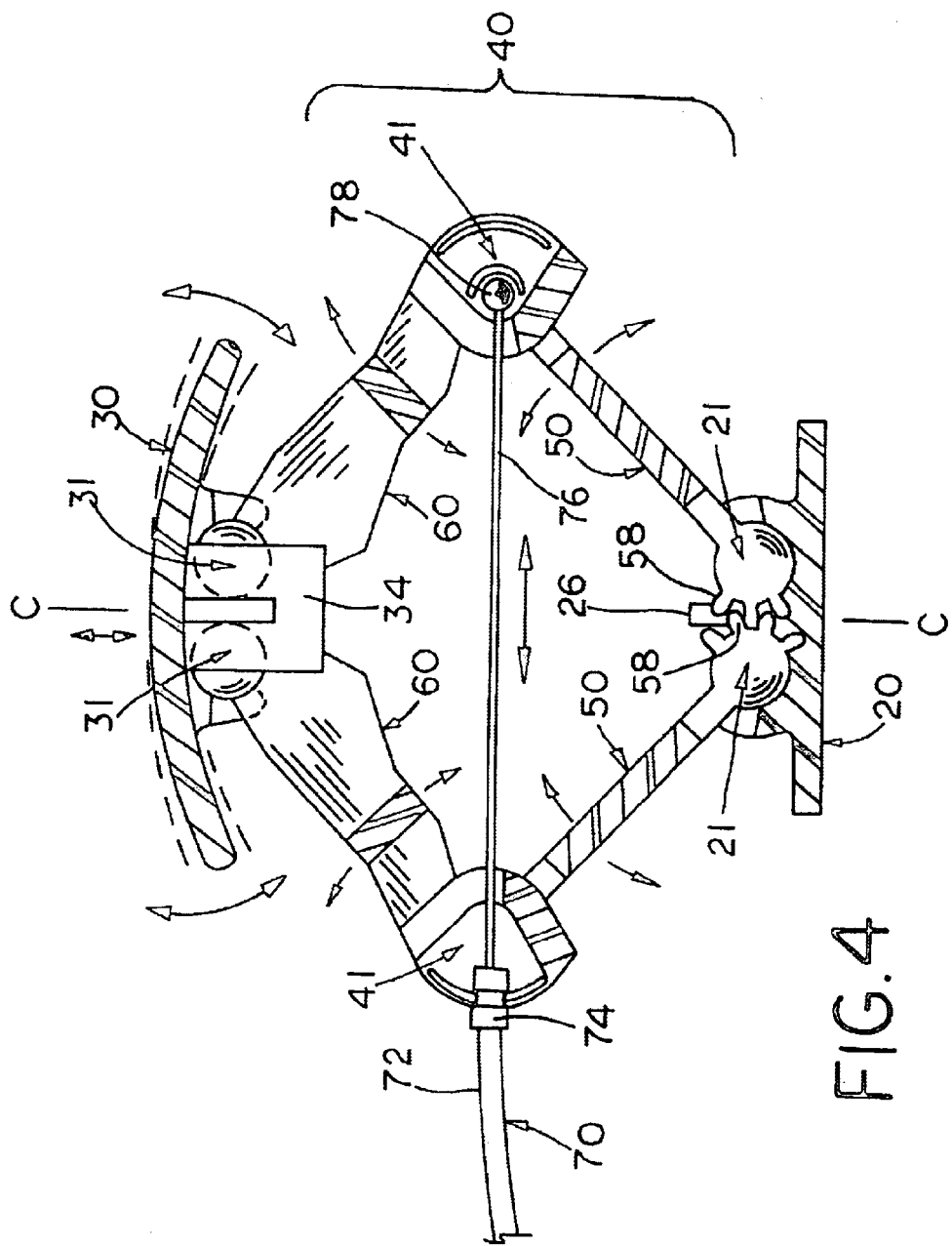
FIG. 4 is a side sectional view of the lumbar support of this invention in an intermediate position illustrating the independent pivotal movement of the lumbar plate.
Figure 5:
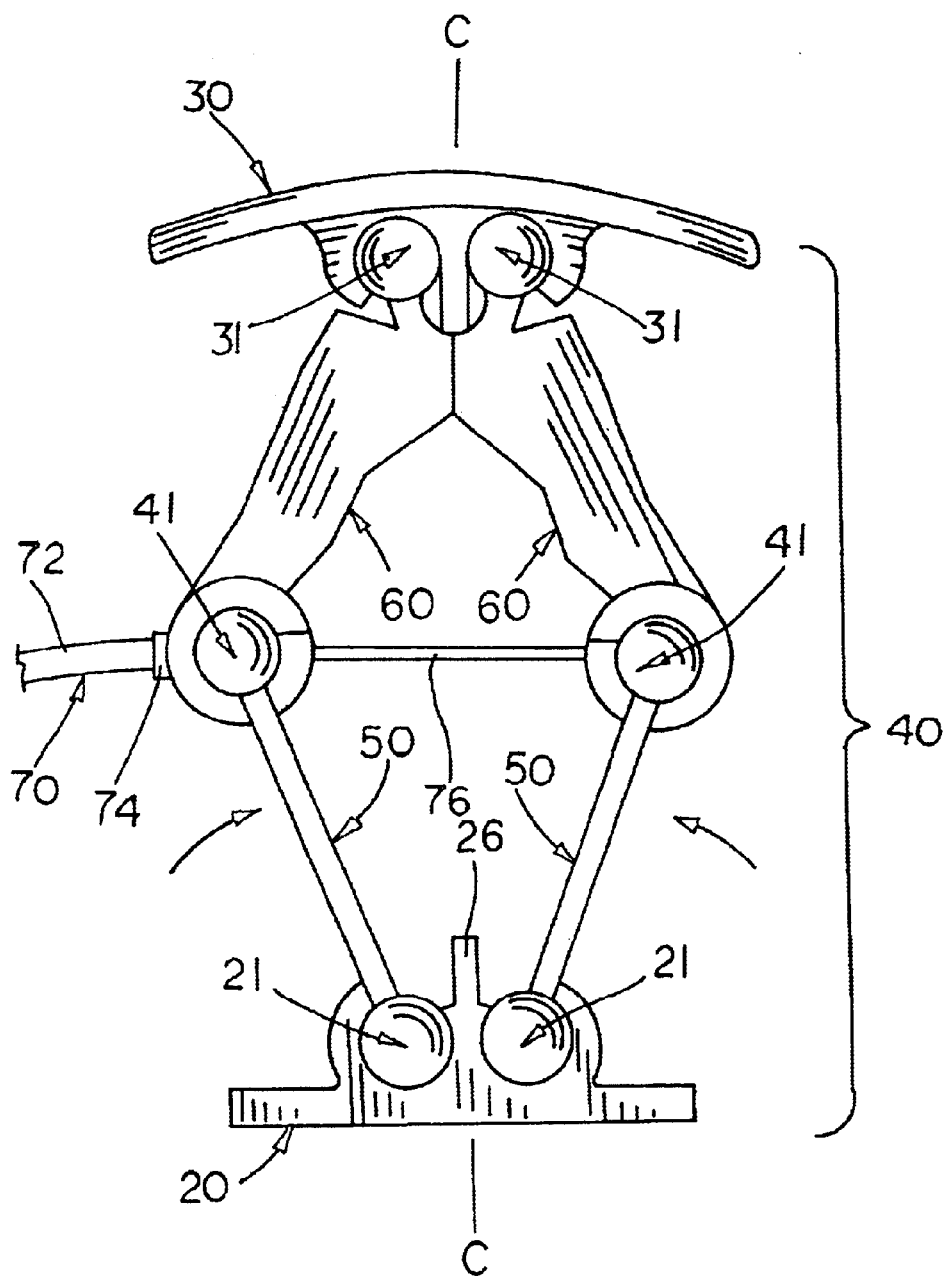
FIG. 5 is a side sectional view of the lumbar support of this invention in its fully extended position.
Figure 6:
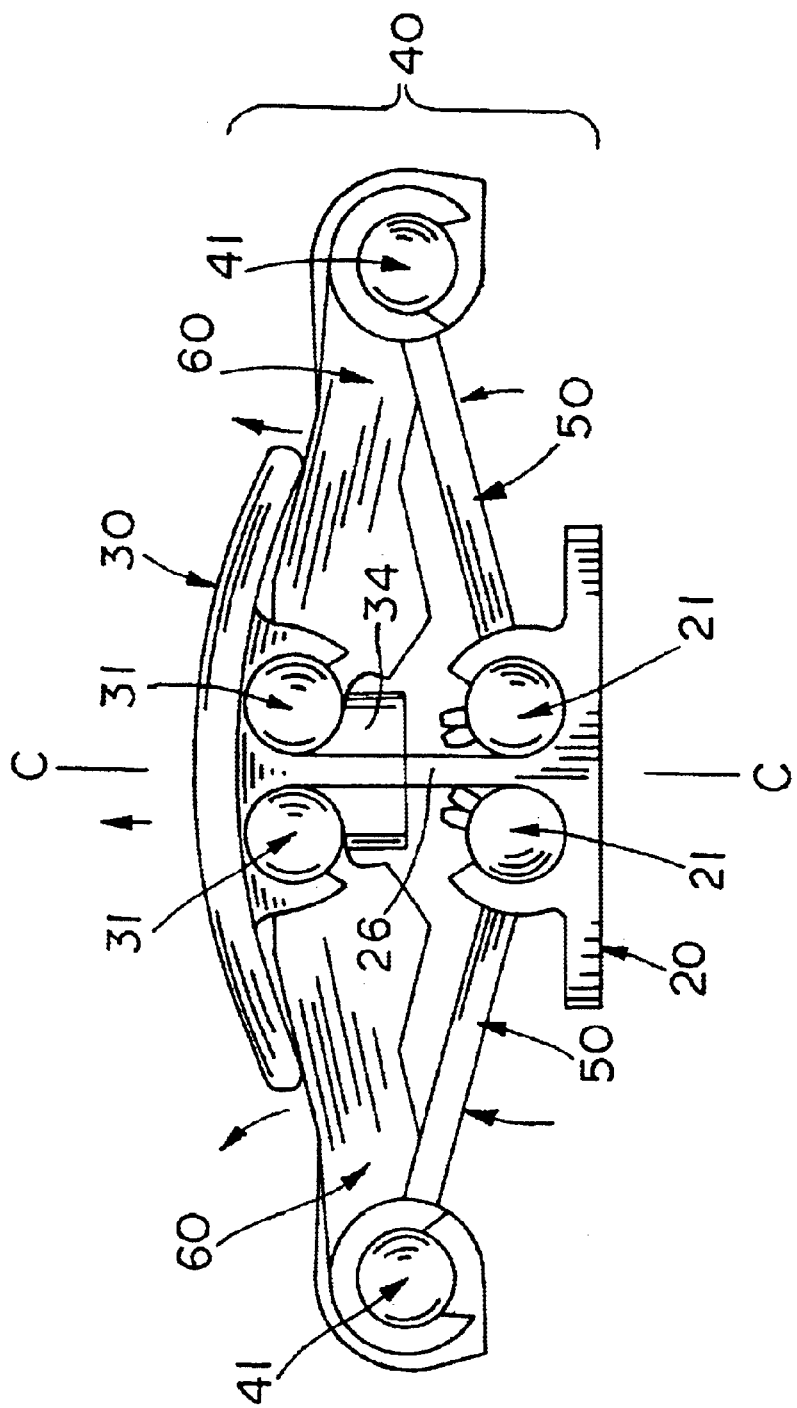
FIG. 6 is a side sectional view of the lumbar support of this invention in its fully retracted position.

As illustrated best in FIGS. 4–6, each linkage arm 40 includes a lower segment 50 and an upper segment 60. Lower segment 50 and an upper segment 60 are pivotally connected by an elbow joint, which is designated only in FIGS. 4–6 as reference numeral 41. As shown, lower segments 50 are pivotally connected to mounting base 20 by two base joint, which are designated only in FIGS. 4–6 as reference numeral 21. Similarly, upper segments 60 are pivotally connected to lumbar plate 30 by two lumbar joints, which are designated only in FIGS. 4–6 as reference numeral 31. These six joints, base joint 21, lumbar 31 and elbow joint 41, allow lumbar plate 30 to be extended and retracted from mounting base 20, while allowing the lumbar plate a limited degree of pivotal movement. The six joints are illustrated in the figures and described in the preferred embodiment as "knuckle" type joint although other types of pivotal connections may be employed, such as leaf hinges and deformable joints.

As shown best in FIGS. 3 and 4–6, mounting base 20 has a basically flat rectangular body 22, which is shaped and dimensioned to be incorporated as the modular component within a particular seat back (not shown). Mounting base 20 includes a pair of joint seats 25 formed therein at opposite ends of the mounting base. Joint seats 25 constitute part of base joints 21 and are formed by center ridge 26 and a pair parallel ears 28, which extend from the upper face of mounting base 20.

As shown best in FIGS. 1 and 4–6, lumbar plate 30 has a rectangular shape and is curved along about its longitudinal axis to form a convex outer face and a concave inner face. The mounting bracket and lumbar plate are dimensioned to accommodate the desired length of lumbar support 10 and mounting requirements for the particular seating application. The convex outer face is shaped to provide a desirable curved surface for the lumbar region of the back. Lumbar plate 30 has two stop tabs 34 extending downward from its concave inner face. As with mounting base 20, lumbar plate 30 includes a pair of joint seats 35 formed therein at opposite ends of the lumbar plate. Joint seats 35 constitute part of lumbar joints 31 and are formed by a center ridge 36 and a pair of parallel ears 38, which extends from the concave face of lumbar plate 30.

Figure 3:
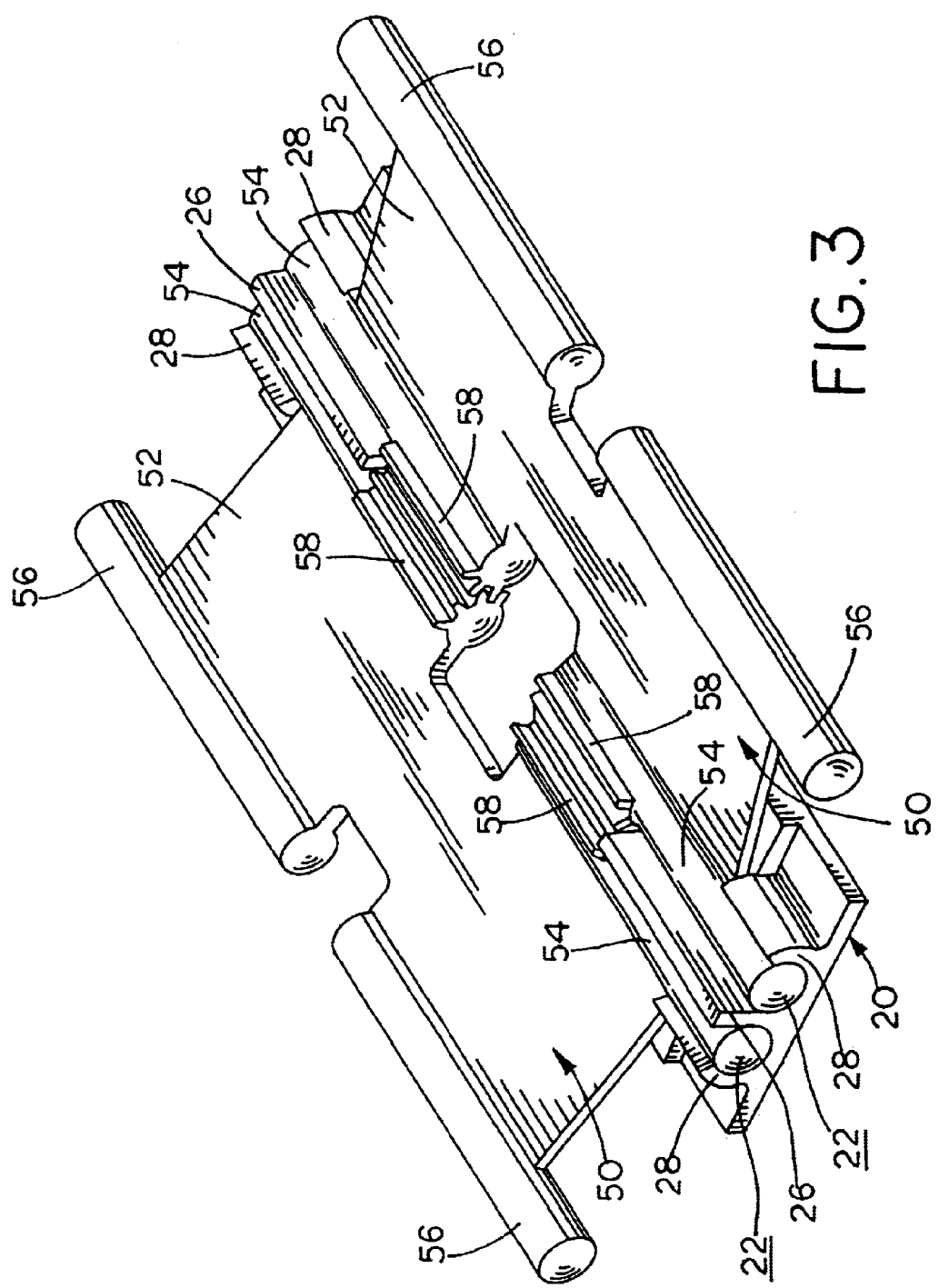
FIG. 3 is perspective view of the lumbar support of this invention with the lumbar plate and the upper segment of the articulate arms removed.

As best shown in FIG. 3, lower segments 50 of linkage arms 40 includes a flat rectangular body or band 52 and a pair of parallel cylindrical joint shafts 54, 56 which extend along the longitudinal edges of the band and extends longitudinally beyond both lateral ends of the band. Joint shafts 54 forms the pivot pin of base joint 21 and is seat securely within joint seats 25 of mounting base 20 in an interlocking snap fit connection. Joint shaft 56 forms the pivot pin of elbow joint 41. Each of lower segment 50 also include a plurality of longitudinal ribs or teeth extending from joint shaft 54, which provides a section of toothed gear 58. When lower segments 50 are pivotally connected to mounting base 20, gear teeth 58 of each lower segment mesh together to ensure symmetrical angular movement of both lower segments 50 as the lumbar support is extended and retracted by the articulation of linkage arms 40.

Figure 2:
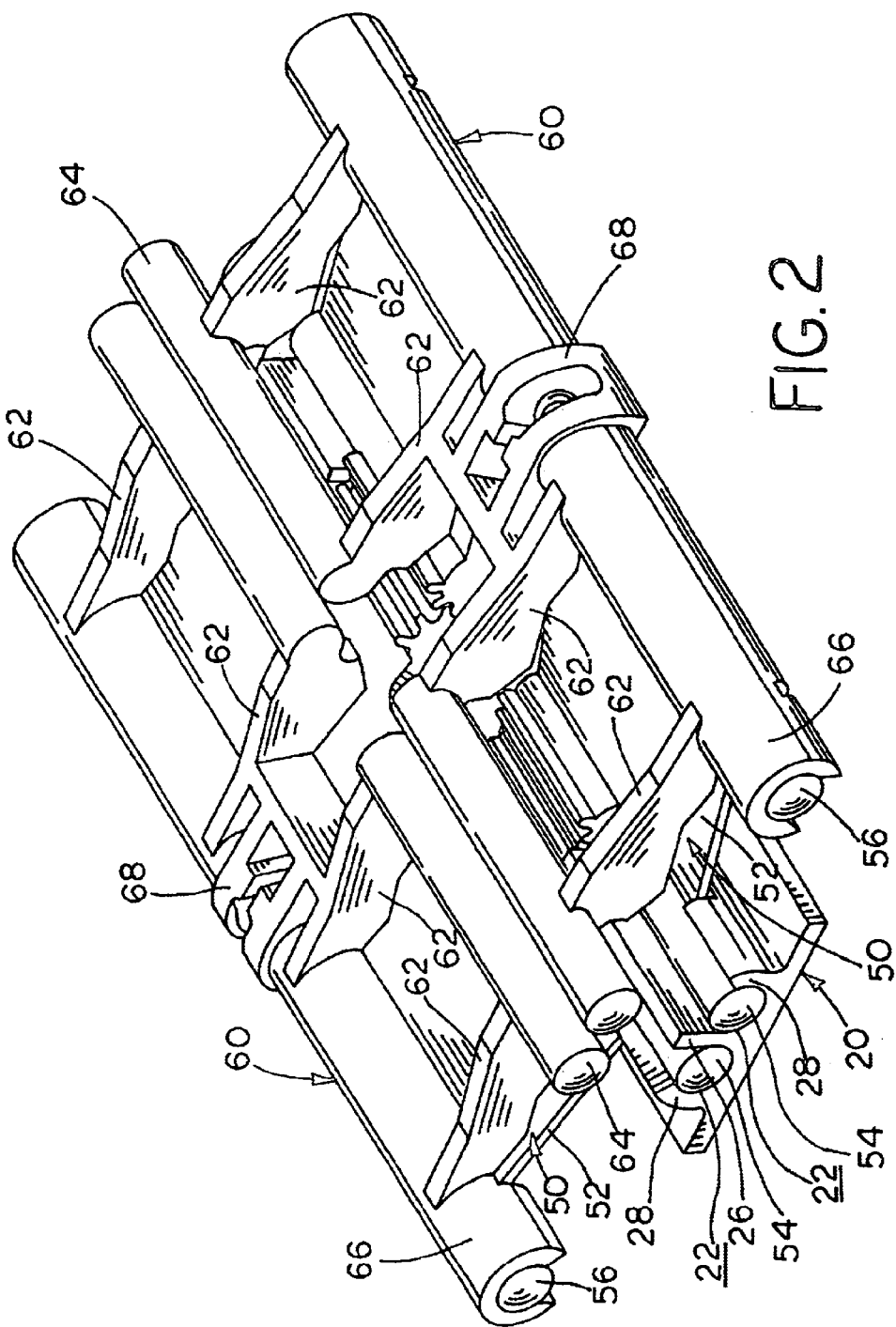
FIG. 2 is a perspective view of the lumbar support of this invention with the lumbar plate removed to reveal the mounting base and articulated arms.

As best shown in FIG. 2, upper segments 60 of each linkage arm 40 includes a cylindrical joint shaft 64 and a tubular joint seat 66 and four cross members 62, which integrally connect the joint shaft and the joint seat in parallel. Joint seat 66 constitutes part of elbow joint 41 and has a tubular body with a longitudinal portion of the sidewall removed to which forms the open cylindrical clevis to receive joint shaft 54 in an interlocking snap fit connection. Joint shafts 64 forms the pivot pin of lumbar joint 31 and is seat securely within joint seats 35 of lumbar plate 30 in an interlocking snap fit connection. Cross beams 62 are shaped to provide sufficient structural integrity to linkage arms 40. In addition, cross beams 62 have a stop face 63, which is angled to act as a stop to limit the extension travel of linkage arms 40. As shown, upper segments 60 also include Bowden cable seats 68. Cable seats 68 are formed by slotted counterbores in the tubular seat joints 66.

As shown in FIGS. 4–6, a Bowden cable 70 is used actuated lumbar support 10 between its fully extended and retracted positions. Bowden cable 70 includes a sheath 72 having a ferrule 74, and a wire cable 76 having an end retainer 78. Typically, Bowden cable 70 is operatively connected to any conventional rotary control or regulator (not shown). Such controls and adjustment regulators are mounted to the seat frame in a location that is easily accessible to an individual seated in the seat. Bowden cable 70 extends from control (not shown) and is operatively connected to linkage arms 40. As shown, ferrule 74 is securely seated within cable seat 68 of one linkage arm 40 while retainer 78 is securely seated within cable seat 68 of the other linkage arm 40. Typically, a conventional manual or automated rotary control (not shown) is used to extend and retract cable 76 through sheath 72. If desired, the rotary control may be replaced by a variety of other conventional controls, including lever actuated and motorized controls.

Operation

FIGS. 4–6 illustrate the operation of lumbar support 10. Lumbar support 10 is mounted within a seat back (not shown) using any conventional method. The lumbar plate is positioned to abut against the flexible padding material (also not shown) of the seat back to adjust the outer contour of the seat back in the lumbar region. As shown, extension and retraction of Bowden cable 70 extends and collapses linkage arms 40 to moves lumbar plate 30 linearly along a central axis C—C toward and away from mounting base 20.

As illustrated in FIG. 4, lumbar plate 30 is will "float," that is pivot and shift independently of the actuation of the linkage mechanism between the fully retracted and fully extended positions to provide a self adjusting surface contour to the seat back. The "floating" action of lumbar support 30 is created by the two independent and parallel axis of rotation of lumbar joints 31 and the two independent and parallel axis of rotation of elbow joints 41. As shown, lumbar plate 30 is free to pivot and shift about the two independent axis of rotation provided by pivot pin shaft 64 of lumbar joint 31 since both upper segments 60 of each linkage arm 40 pivots about elbow joints 41 independently of each other. As a result, the "floating" action creates a self adjustment mechanism. The "floating" action ensures that the lumbar plate remains parallel to the seat back even as a seat occupant shifts in the seat. In addition, the "floating" action ensures that the longitudinal edges of the lumbar plate will not protruding through the seat back to be noticeable by the seat occupant.

FIG. 5 illustrates lumbar support 10 in its fully extended position. Pulling elbow joints 41 together extends linkage arms 40 to move lumbar plate 30 away from mounting base 20. In the fully extended position, lumbar plate 30 is locked in a stationary position and its "floating" action is arrested by the engagement of linkage arms 40. In the fully extending position, the abutment of stop faces 63 of each upper segment 60 arrests the "floating" action of lumbar plate 30. In addition, the abutment of the stop faces provides a mechanical limit to the travel of lumbar support. 10.

FIG. 6 illustrates lumbar support 10 in its fully retracted position. Pushing elbow joints 41 away from each other collapses linkage arm 40 to move lumbar plate 30 toward mounting base 20. In the fully retracted position, stop brackets 34 of lumbar plate 30 abut against center ridge 26 of mounting base 20. Again, stop brackets 34 limits the full range of trave of the linkage mechanism when retracted. This mechanical limit to the retraction travel is important to reducing the pulling force required to actuate lumbar support 10. As shown in FIG. 4 stop tabs prevent upper and lower segments of articulated linkage arms 40 from fully collapsing and thereby lying in the plane of the pull of Bowden cable 70. Maintaining a minimum initial angle of inclination between the articulated linkage arms and the plane of the cable pull allows lumbar support 10 to use less cable force to actuate the lumbar support from the fully retracted position.

Advantages

One skilled in the art will note several advantages of lumbar support 10. The use of composite materials and plastics reduces the weight of the lumbar support while maintaining sufficient structural strength and integrity. The use of composite and plastic construction allows the components to be assembled by snap fit interlocking connection, thereby eliminating fasteners and other linkage components. The use of composites and plastics also provides the lumbar support with a degree of structural resilience. The composite construction linkage mechanism will flex and give slightly under the weight of the seat occupant thereby providing more comfortable support to the occupant.

The independent "floating" action of the lumbar plate also significantly increases the comfort of the seat occupant. Since the attitude of the lumbar plate is not permanently fixed to the linkage mechanism, the lumbar plate will pivot and float with the movement of the occupant in the seat. Unlike conventional scissor type lumbar supports, which have rigid fixed lumbar plates, the lumbar support of this invention allows the lumbar plate to "float" or self adjust with the movement of the seat occupant. The "floating" action ensures that the lumbar plate remains parallel to the seat back and the longitudinal edges will not protruding through the seat back to be noticeable by the seat occupant.

One skilled in the art will also note that the lumbar support of this invention also uses a no load linkage mechanism. Unlike conventional arching type lumbar supports, which have an inherent mechanical spring tension on the actuation controls, lumbar support of this invention eliminates any additional mechanical load on the actuation control from the linkage mechanism. The only load on the actuation control results from the weight of the individual components, which is reduced by the use of composites and plastics, and the mechanical load of the seat and padding material itself. As a result, lumbar support 10 requires less cable force to actuate, thereby making adjustments faster and easier on the seat occupant.

It is understood that the above description does not limit the invention to the details given, but may be modified within the scope of the following claims.

I claim:

1. An adjustable lumbar support, in a seat having a backrest, for altering the contour of the backrest to provide adjustable lumbar support to a seat occupant, the lumbar support comprising:

a base capable of being suspended within the backrest;

a lumbar plate;

linkage means pivotally connected between the base and lumbar plate for moving the lumbar plate toward and away from the base between an extended position and a retracted position to incrementally adjust the contour of the backrest, the linkage means includes a pair of articulated arms, a first joint means for pivotally connecting each of the articulated arms to the base, and a second joint means for pivotally connecting each of the articulated arms to the lumbar plate so as to allow independent pivotal movement of the lumbar plate with respect to each of the articulated arms when the lumbar plate is between the extended position and retracted position, each of the articulated arms includes an upper segment, a lower segment and a third joint means for pivotally connecting the upper segment to the lower segment; and means operatively connected to the linkage means for actuating the linkage means to selectively move the lumbar plate between the extended position and the retracted position, the actuating means includes a Bowden cable connected to the third joint means of each of the articulated arms, such that the Bowden cable can pull the third joint means of each of the articulated arms apart to move the linkage means to the retracted position and push the third joint means of each of the articulated arms together to move the linkage means to the extended position.

2. The lumbar support of claim 1 wherein the lumbar plate includes a first joint seat and a second joint seat, the upper segment of each of the articulated arms includes a pivot shaft at one end thereof, the pivot shaft of the upper segment of one of the articulated arms is pivotally seated within the first lumbar joint seat for rotational movement about a first axis and the pivot shaft of the upper segment of the other of the articulated arms is pivotally connected to the second lumbar plate joint seat for rotational movement about a second axis.

3. The lumbar support of claim 2 wherein the first lumbar plate joint seat, the second lumbar plate joint seat, and the pivot shaft of the upper segment of each of the articulated arms constitutes part of the second joint means.

4. The lumbar support of claim 1 wherein the linkage means includes gear means operatively associated with each of the articulated arms for ensuring that the lower segment of each of the articulated arms pivots with symmetrical angular movement as the linkage means is selectively moved between the extended position and the retracted position.

5. The lumbar support of claim 4 wherein the gear means includes a plurality of ribs extending from the lower segment of each of the articulated arms, the plurality of ribs of the lower segment of one of the articulated arms is intermeshed with the plurality of ribs of the lower segment of the other of the articulated arms.

6. The lumbar support of claim 1 wherein the base includes a first joint seat and a second joint seat, the lower segment of each of the articulated arms includes a pivot shaft at one end thereof, the pivot shaft of the lower segment of one of the articulated arms is pivotally seated within the first base joint seat for rotational movement about a first axis and the pivot shaft of the lower segment of the other of the articulated arms is pivotally connected to the second base joint seat for rotational movement about a second axis.

7. The lumbar support of claim 6 wherein the first base joint seat, the second base joint seat, and the pivot shaft of the lower segment of each of the articulated arms constitutes part of the first joint means.

8. The lumbar support of claim 7 wherein the first joint means includes gear means operatively associated with each of the articulated arms for ensuring that the lower segment of each of the articulated arms pivots with symmetrical angular movement as the linkage means is selectively moved between the extended position and the retracted position.

9. The lumbar support of claim 8 wherein the gear means includes a plurality of ribs extending from the pivot shaft of the lower segment of each of the articulated arms, the plurality of ribs of the pivot shaft of the lower segment of one of the articulated arms is intermeshed with the plurality of ribs of the pivot shaft of the lower segment of the other of the articulated arms.

10. An adjustable lumbar support, in a seat having a backrest, for altering the contour of the backrest to provide adjustable lumbar support to a seat occupant, the lumbar support comprising:

a base capable of being suspended within the backrest;

a lumbar plate;

linkage means pivotally connected between the base and lumbar plate for selectively moving the lumbar plate toward and away from the base between an extended position and a retracted position to incrementally adjust the contour of the backrest, the linkage means includes a pair of articulated arms, a first joint means for pivotally connecting each of the articulated arms to the base, and a second joint means for pivotally connecting each of the articulated arms to the lumbar plate so as to allow independent pivotal movement of the lumbar plate with respect to each of the articulated arms when the lumbar plate is between the extended position and retracted position, each of the articulated arms includes an upper segment, a lower segment and a third joint means for pivotally connecting the upper segment to the lower segment, the base includes a first joint seat and a second joint seat, the lower segment of each of the articulated arms includes a pivot shaft at one end thereof, the pivot shaft of the lower segment of one of the articulated arms is pivotally seated within the first base joint seat for rotational movement about a first axis and the pivot shaft of the lower segment of the other of the articulated arms is pivotally connected to the second base joint seat for rotational movement about a second axis, the pivot shaft of the lower segment of each of the articulated arms includes a plurality of ribs extending therefrom, the plurality of ribs of the pivot shaft of the lower segment of one of the articulated arms is intermeshed with the plurality of ribs of the pivot shaft of the lower segment of the other of the articulated arms so as to ensure that the lower segment of each of the articulated arms pivots with symmetrical angular movement as the linkage means is selectively moved between the extended position and the retracted position.

11. The lumbar support of claim 10 wherein the lumbar plate includes a first joint seat and a second joint seat, the upper segment of each of the articulated arms includes a pivot shaft at one end thereof, the pivot shaft of the upper segment of one of the articulated arms is pivotally seated within the first lumbar joint seat for rotational movement about a first axis and the pivot shaft of the upper segment of the other of the articulated arms is pivotally connected to the second lumbar plate joint seat for rotational movement about a second axis.

12. The lumbar support of claim 11 wherein the first lumbar plate joint seat, the second lumbar plate joint seat, and the pivot shaft of the upper segment of each of the articulated arms constitutes part of the second joint means.

13. The lumbar support of claim 10 wherein the first base joint seat, the second base joint seat, and the pivot shaft of the upper segment of each of the articulated arms constitutes part of the first joint means.

14. An adjustable lumbar support of the type disposed within a seat backrest for altering the contour of the backrest to provide adjustable lumbar support to a seat occupant, the lumbar support comprising:

a base capable of being suspended within the backrest;

a lumbar plate;

linkage means pivotally connected between the base and lumbar plate for moving the lumbar plate toward and away from the base between an extended position and a retracted position to incrementally adjust the contour of the backrest; and means operatively connected to the linkage means for actuating the linkage means to selectively move the lumbar plate between the extended position and the retracted position, the linkage means includes a pair of articulated arms, each of the articulated arms having a lower segment pivotally connected to the base and an upper segment pivotally connected to the lumbar plate, the upper segment and lower segment of each articulated arm is pivotally connected together so as to allow independent pivotal movement of the lumbar plate with respect to the upper segment of each of the articulated arms, and means operatively connected to the linkage means for actuating the linkage means to selectively move the lumbar plate between the extended position and the retracted position, the actuating means includes a Bowden cable operatively connected to the articulated arms, such that the Bowden cable can pull the articulated arms apart to move the linkage means to the retracted position and push the articulated arms together to move the linkage means to the extended position.

* * * * *